(12) United States Patent
Müller et al.

(10) Patent No.: US 9,341,470 B2
(45) Date of Patent: May 17, 2016

(54) LIGHT SECTION SENSOR

(71) Applicant: BAUMER ELECTRIC AG, Frauenfeld (CH)

(72) Inventors: Klaus Friedrich Müller, Heidelberg (DE); Walter Hochgenug, Gross-Bieberau (DE)

(73) Assignee: BAUMER ELECTRIC AG, Frauenfeld (CH)

( * ) Notice: Subject to any disclaimer, the term of this patent is extended or adjusted under 35 U.S.C. 154(b) by 0 days.

(21) Appl. No.: 14/489,701

(22) Filed: Sep. 18, 2014

(65) Prior Publication Data

US 2015/0109615 A1  Apr. 23, 2015

(30) Foreign Application Priority Data

Oct. 22, 2013  (EP) .................................... 13189729

(51) Int. Cl.
*G01B 11/26* (2006.01)
*G01B 11/00* (2006.01)
*G01B 11/24* (2006.01)
*G01B 11/25* (2006.01)

(52) U.S. Cl.
CPC .............. *G01B 11/26* (2013.01); *G01B 11/002* (2013.01); *G01B 11/24* (2013.01); *G01B 11/25* (2013.01)

(58) Field of Classification Search
CPC ........... G01B 11/2513; G01B 11/2518; G01B 11/25; G01B 11/24; G01B 11/2509; G01B 11/2545; G01B 11/002; G01B 2290/35; G01B 2290/70; G01B 9/02007; G01B 9/0203; G01B 9/02049; G01B 9/02069; G01B 9/02079
See application file for complete search history.

(56) References Cited

U.S. PATENT DOCUMENTS

| 5,477,332 | A | * | 12/1995 | Stone | G01N 21/55 348/128 |
| 5,831,736 | A | * | 11/1998 | Lichtman | G02B 21/22 250/559.22 |
| 2004/0233461 | A1 | * | 11/2004 | Armstrong | G01C 11/025 356/620 |
| 2005/0062939 | A1 | * | 3/2005 | Tamura | G03B 21/14 353/69 |
| 2008/0312866 | A1 | | 12/2008 | Shimomura et al. | |
| 2010/0085577 | A1 | * | 4/2010 | Kostka | G01B 11/25 356/610 |
| 2012/0081542 | A1 | * | 4/2012 | Suk | G06K 9/00805 348/139 |
| 2012/0154577 | A1 | * | 6/2012 | Yoshikawa | H04N 7/18 348/140 |
| 2012/0307028 | A1 | * | 12/2012 | Kanamori | A61B 1/00009 348/65 |

FOREIGN PATENT DOCUMENTS

JP  H07 174537 A  7/1995

* cited by examiner

*Primary Examiner* — Michael P Stafira
(74) *Attorney, Agent, or Firm* — McGlew and Tuttle, P.C.

(57) ABSTRACT

A light section sensor for providing an output of a digital output coordinate has an illuminating device for projecting a light line onto a measured object and an electronic camera for detecting the projected light line on the measured object. A processing device determines at least one measured coordinate in a measured coordinate system on the basis of the light line detected. A coordinate transformation device transforms the measured coordinates from the measured coordinate system into the output coordinates in an output coordinate system by a coordinate transformation. A slope angle determination device determines the slope angle of the light section sensor in relation to a flat surface of the measured object.

21 Claims, 4 Drawing Sheets

LIGHT SECTION SENSOR

CROSS REFERENCE TO RELATED APPLICATIONS

This application claims the benefit of priority under 35 U.S.C. §119 of European Patent Application EP 13 18 9729.0 filed Oct. 22, 2013, the entire contents of which are incorporated herein by reference.

FIELD AND BACKGROUND OF THE INVENTION

The present invention pertains to a light section sensor for outputting at least one digital output coordinate.

SUMMARY OF THE INVENTION

An underlying object of the present invention is to provide a light section sensor and a method for a light section sensor as well as a light section sensor according to the triangulation principle, in which the light section sensor can be used at different slopes without an output coordinate being affected by the slope.

According to the invention, a light section sensor is provided for providing an output of a digital output coordinate, with an illuminating means for projecting a light line onto a measured object such as a laser producing a light line which is as narrow and bright as possible. An electronic camera is provided for detecting the projected light line on the measured object in cooperation with a processing means for determining at least one measured coordinate in a measured coordinate system, or measuring coordinate system, on the basis of the light line detected (such as one or more processors). A coordinate transformation means is provided for transforming the measured coordinate from the measured coordinate system into an output coordinate in an output coordinate system by means of a coordinate transformation. The light section sensor further comprises a slope angle determination means for determining the slope angle of the light section sensor in relation to a flat surface of the measured object.

According to another aspect of the invention, a method is provided for providing an output of a digital output coordinate by means of a light section sensor. The method comprises the steps of: projecting a light line onto a measured object by means of an illuminating means; detecting the projected light line on the measured object, by means of an electronic camera; determining at least one measured coordinate in a measured coordinate system on the basis of the detected light line by means of a processing means; and transforming the measured coordinate from the measured coordinate system into the output coordinate in an output coordinate system by means of a coordinate transformation by a coordinate transformation means, wherein this comprises a slope angle determination means for determining the slope angle of the light section sensor in relation to a flat surface of the measured object.

According to the first aspect of the present invention, the object is accomplished by a light section sensor for providing an output of digital output coordinates, with an illuminating means for projecting a light line onto a measured object and with an electronic camera for detecting the projected light line on the measured object. The detection may take place here according to the triangulation principle (for example with the camera offset in the X direction from the laser such that the angles of the camera and the laser are known and the spacing between the camera and the laser, in the X direction, are known) or even according to the light travel time principle (in which the angle of the camera and the distance from the camera to the line, and to each point on a line projected by the laser, is known). Further, a processing means for determining at least one measured coordinate in a measured coordinate system on the basis of the detected light line and a coordinate transformation means for transforming the measured coordinate from the measured coordinate system into the output coordinate in an output coordinate system by means of a coordinate transformation are provided. For example, the technical advantage that the output coordinates of a light section sensor with a coordinate system correspond to those that would be outputted by a light section sensor in another coordinate system is achieved thereby. An intentionally skewed setting of the light section sensor is made possible, so that a user has great degrees of freedom in installing or for attaching the light section sensor.

In an advantageous embodiment of the light section sensor, the coordinate transformation is based on a rotation matrix. For example, the technical advantage that the rotation of the light section sensor can be compensated is achieved thereby.

In another advantageous embodiment of the light section sensor, the rotation matrix describes a rotation of the light section sensor by a slope angle in relation to a flat surface of the measured object. For example, the technical advantage that a slope of the light section sensor can be compensated is achieved thereby.

In another advantageous embodiment of the light section sensor, the light section sensor comprises a slope angle determination means for determining the slope angle of the light section sensor in relation to a flat surface of the measured object. For example, the technical advantage that the slope angle can be automatically determined and compensated is achieved thereby.

In another advantageous embodiment of the light section sensor, the slope angle determination means is configured to determine the slope angle on the basis of the detected light line. For example, the technical advantage that the slope angle determination can be performed by the light section sensor alone without additional technical measures is achieved thereby.

In another advantageous embodiment of the light section sensor, the slope angle determination means is configured to determine the slope angle on the basis of the longest straight segment of the detected light line. For example, the technical advantage that it is not necessary to remove interfering contours is achieved thereby.

In another advantageous embodiment of the light section sensor, the light section sensor comprises a data interface for inputting the slope angle. For example, the technical advantage that the slope angle can be reset from the outside is achieved thereby.

In another advantageous embodiment of the light section sensor, the coordinate transformation is based on a shift vector. For example, the technical advantage that the zero point of the coordinate system can be displaced is achieved thereby.

In another advantageous embodiment of the light section sensor, the light section sensor is configured to output the output coordinate and the measured coordinate via a data interface. For example, the technical advantage that both coordinates are outputted, so that the measured object can be detected from two directions at the same time, is achieved thereby.

The processing means is configured in another advantageous embodiment of the light section sensor to determine the measured coordinates from a predetermined image area of the electronic camera. For example, the technical advantage that the light line is analyzed in this image area only and interfering contours in other image areas can be ignored is achieved thereby.

The coordinate transformation is a real-time coordinate transformation in another advantageous embodiment of the light section sensor. For example, the technical advantage that an immediate output of the output coordinate takes place in time is achieved thereby.

According to the second aspect of the present invention, the method for providing an output of a digital output coordinate by means of a light section sensor is accomplished with the steps of projecting a light line onto a measured object by means of an illuminating means; detecting the projected light line on the measured object by means of an electronic camera; determining at least one measured coordinate in a measured coordinate system on the basis of the detected light line by means of a processing means; and transforming the measured coordinate from the measured coordinate system into the output coordinate in an output coordinate system by means of a coordinate transformation by a coordinate transformation means. The same technical advantages as those achieved by the light section sensor according to the first aspect are achieved thereby.

In an advantageous embodiment of the method, the coordinate transformation is based on a rotation matrix. For example, the technical advantage that a rotation of the light section sensor can be compensated is achieved thereby.

In another advantageous embodiment of the method, the method comprises the step of determining a slope angle of the light section sensor in relation to a flat surface of the measured object. For example, the technical advantage that the slope angle can be determined and compensated automatically is achieved thereby.

In another advantageous embodiment of the method, the step of determining the slope angle is based on the detected light line. For example, the technical advantage that the slope angle determination can be carried out by the light section sensor alone without additional technical measures is achieved thereby.

Exemplary embodiments of the present invention are shown in the drawings and will be described in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
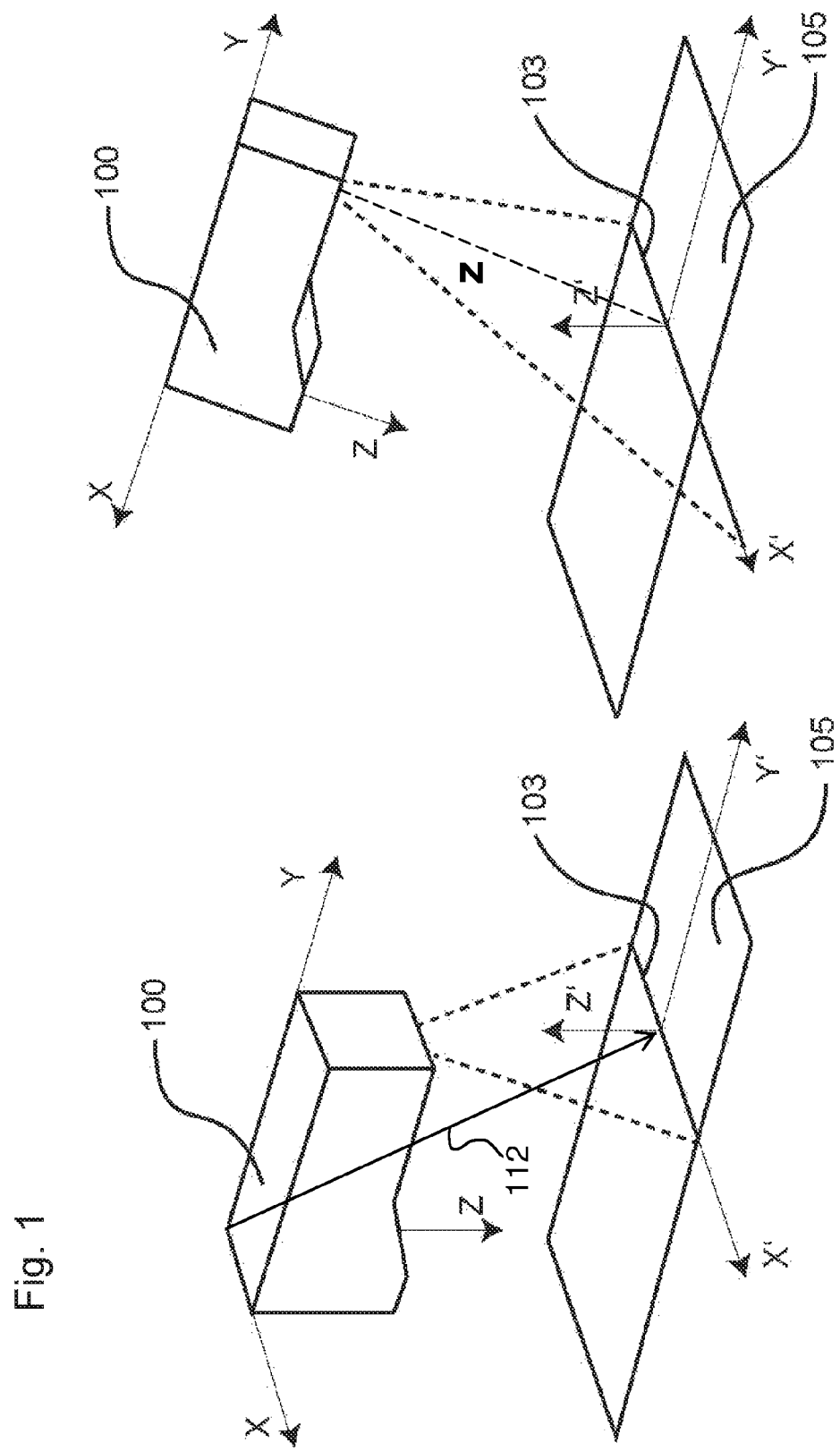
FIG. 1 is a schematic view of a light section sensor in two different coordinate systems.

Referring to the drawings in particular, FIG. 1 shows a view of a light section sensor 100 with two different coordinate systems each—a measured coordinate system X, Y, Z and an output coordinate system X', Y', Z'. The light section sensor 100 comprises an illuminating means as a line projector, which projects on the measured object 105 a light line 103, which is as narrow and bright as possible, for example, a laser. In addition, the light section sensor 100 comprises an electronic camera, which observes and detects the projection of the line on the measured object 105. A displacement or change of the light line 103 in the camera image is converted into coordinates by a processing means with the methods of photogrammetry.

The light section sensor 100 detects a two-dimensional profile of a measured object 105. The sensor has been calibrated in advance in the factory in a way that it can determine the positions of all points on the projected light line inside its detection range as exact coordinates in the X, Y, Z coordinate system. The X, Y, Z system is also referenced herein as the sensor system. The profile is already calibrated for the light section sensor 100, so that the output coordinates are available as data in the form of X and Z coordinates, for example, in mm.

In a first coordinate system X, Y, Z, the light section sensor 100 is arranged, for example, at right angles above a measured object 105, which is formed by a flat surface. A light line 103 is projected onto the flat surface of the measured object 105. The measured object 105 is, for example, a material web, which is moved past under the light section sensor 100. The light section sensor 100 determines, for example, the coordinates of an edge of the material web as measured coordinates in the measured coordinate system X, Y, Z. Here, X' is parallel to X and Z' is parallel to Z. An output coordinate system X', Y', Z', in which the coordinates shall be outputted by the light section sensor 100, is arranged on the measured object 105 and is aligned with this.

The light section sensor 100 is sloped in another coordinate system X, Y, Z about the Y axis in relation to the measured object 105. The light line 103 is projected obliquely onto the measured object 105. The light section sensor 100 determines, for example, the coordinates of an edge of the material web as measured coordinates in the sloped measured coordinate system X, Y, Z. The coordinates shall be outputted by the light section sensor 100 in an output coordinate system X', Y', Z', which is arranged on the measured object 105 and is aligned with same in this case as well. Conversion into the output coordinate system X', Y', Z' takes place in the sensor, as will be described below.

Figure 2:
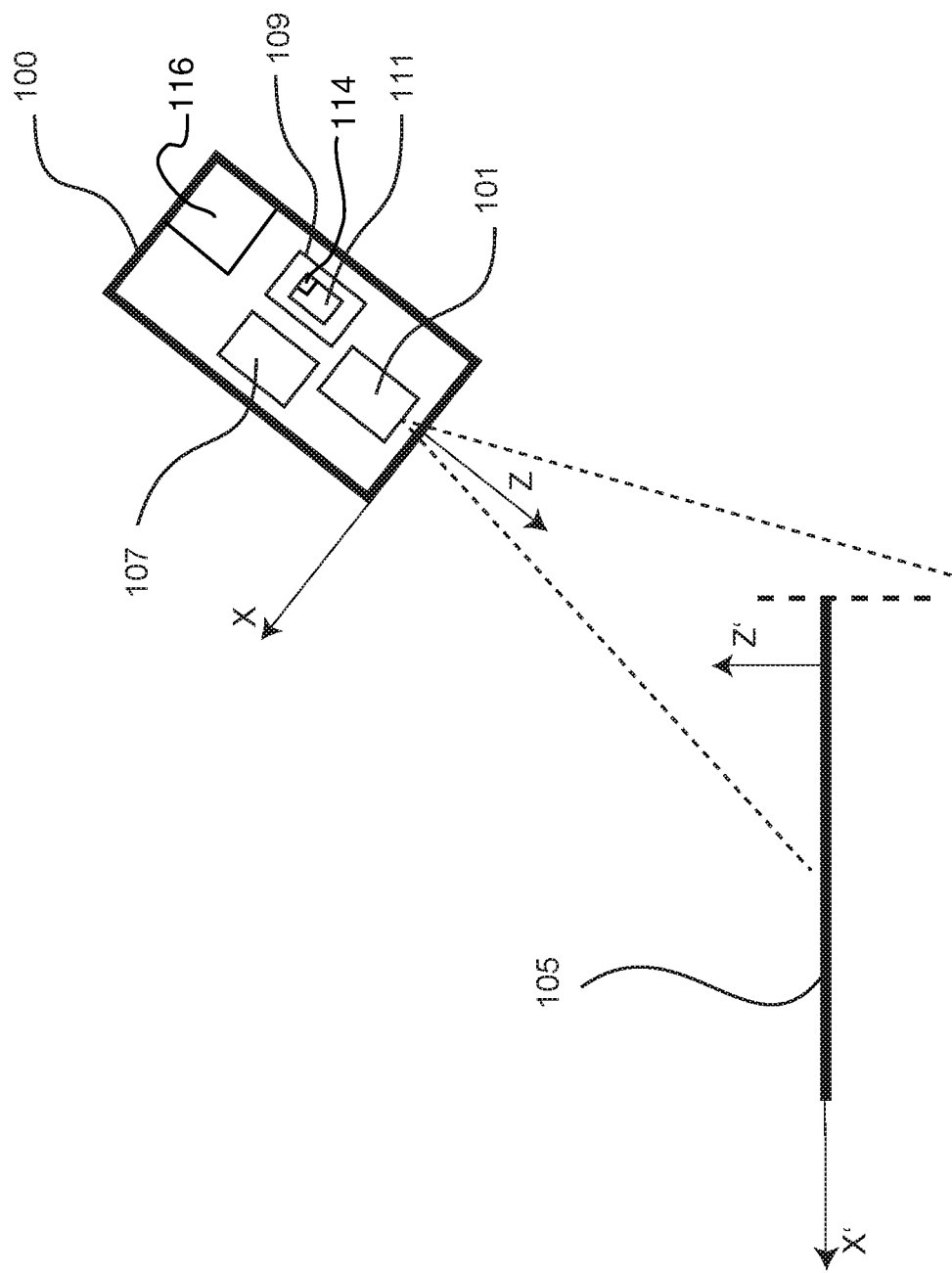
FIG. 2 is a schematic view of the light section sensor and of a measured object.

FIG. 2 shows a schematic view of the light section sensor 100 and of a measured object 105. The light section sensor 100 is arranged sloped in relation to the measured object 105. The light section sensor 100 comprises the illuminating means 101 for projecting the light line 103 onto the measured object 104; the electronic camera 107 for detecting the projected light line 103 on the measured object 105; and the processing means 109 for determining at least one measured coordinate in the measured coordinate system X, Y, Z on the basis of the detected light line 103. The processing means 109 comprises, for example, a processor, which is capable of subjecting the light line 103 detected by the electronic camera 107 to data processing and of generating digital output coordinates.

The light section sensor 100 additionally comprises a coordinate transformation means 111 for transforming the measured coordinate from the measured coordinate system X, Y, Z into the output coordinate in the output coordinate system X', Y', Z by means of a coordinate transformation. The coordinate transformation means 111 is integrated in the light section sensor 100. As a result, the light section sensor 100 outputs a digital output coordinate, which corresponds to the transformed coordinate. The transformed coordinates correspond to an alignment different from the actual alignment of the sensor. The coordinate transformation means 111 may be embodied by a program, which is executed by the processing means 109.

Due to the coordinate transformation means 111, the light section sensor 100 is suitable, for example, for providing an output of the same output coordinates as a light section sensor 100 that is arranged in an output coordinate system X', Y', Z', which is standing at right angles on the measured object 105. The coordinate transformation is based, for example, on a rotation matrix 114 and/or a displacement vector 112.

To obtain a slope angle for the coordinate transformation, the light section sensor 100 may comprise a slope angle determination means for the automatic determination of the slope angle of the light section sensor 100 in relation to a flat surface of the measured object 105. The slope angle determination means uses, for example, the projected light line 103 that is projected by the light section sensor 100 calibrated in advance onto the measured object. A slope angle of the light section sensor 100 in relation to a flat surface of the measured object 105 can then be determined by the processing means on the basis of a single line. If the light line 103 detected should be divided into a plurality of lines, as this may happen in case of projection onto profiled measured objects 105, the straight line section with the greatest length is used by the processing means 109 to calculate the slope angle. As the points may never be exactly on a straight line, a regression line is calculated. If more than one straight line is found on the object, the longest line will be used to determine the slope. The distance and the angle of these line sections can be detected by the light section sensor 100 (according to the triangulation principle or even according to the light travel time principle). A straight line on an object will be detected as a straight line in the sensor system. It can be described with a linear equation in the sensor system. The slope factor of the linear equation is the slope of the straight line in the sensor system. The line itself is the new X' axis. The new Z' axis may, for example, start where the Z axes intersects the straight line. FIG. 1 shows the Z axis in dashed line intersecting the straight line (intersecting the new Z' axis). Further, the origin of X', Y', Z' coordinate system may, in addition, also be shifted by a user defined vector in the X', Z' plane. The calibrated light section sensor 100 generates a reference coordinate system as an output coordinate system X', Y', Z' by means of the longest straight line detected in the measurement range as a reference line. The light section sensor 100 then generates output coordinates X', Y', Z' of the output coordinate system X', Y', Z' in real time by the coordinate transformation of the measured coordinates of the light section sensor 100 and outputs these. This offers the advantage that interfering contours do not compromise the result.

On the whole, a displacement vector 112 and a transformation matrix can be calculated, by means of which the measured coordinate can be transformed from the measured coordinate system of the light section sensor 100 into an output coordinate in an output coordinate system X', Y', Z' as a reference system. The zero line, i.e., the X' axis if Z'=0, can be arranged, aside from in the measured light line, in front of or behind it by a selectable amount (offset value) due to the displacement vector 112. The end of the light line, which was used as a reference, may, however, also be defined as the zero point of the X' axis.

All analysis methods can be applied to this new profile after the coordinate transformation. Both the determination of the reference plane and the conversion of the output are carried out in the light section sensor 100. A simple and easy-to-operate light section sensor 100, which operates similarly to laser distance sensors or line sensors, can be embodied as a result.

The definition of the measurement range and of the coordinate system of the light section sensor 100 may take place by teaching the light section sensor 100. For example, the light section sensor 100 selects its measurement range after teaching in a predefined rectangle in order to use this reference to suppress interferences of other contours.

Contrary to a light section sensor 100, with which only distances and heights or widths and edge positions of the measured object are measured, setting errors, which may arise due to the light section sensor 100 being attached skewed, can be avoided due to the automatic slope angle determination means. In addition, a deliberately skewed setting of the light section sensor 100 in relation to the measuring means is made possible, so that a user has great freedom in installing and aligning the light section sensor 100 and operation is easy. A web edge measurement outside the web and with oblique upward look are made possible by the slope of the light section sensor 100. A great benefit arises.

In addition, a data interface 116 may also be provided, via which a slope angle can be inputted into the processing means 109 from the outside, for example, by means of a computer interface, instead of an automatic determination of the light section sensor.

Figure 3:
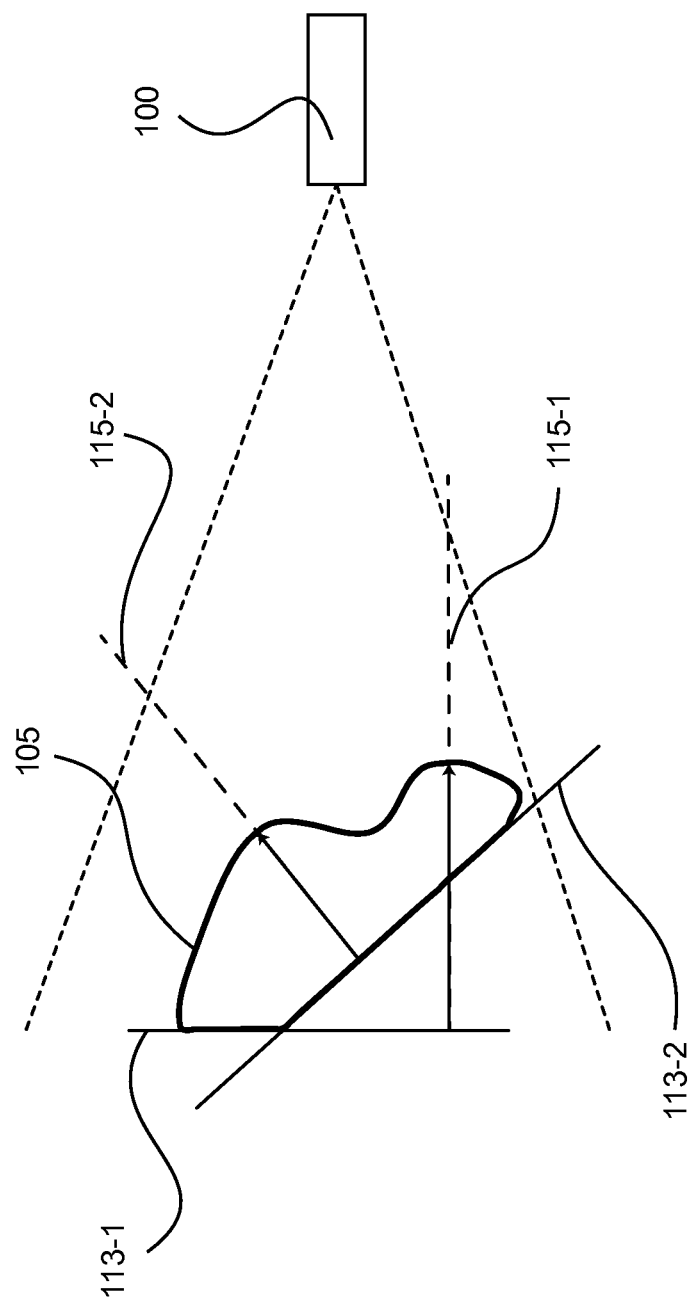
FIG. 3 is a schematic view of the light section sensor in relation to two planes.

FIG. 3 shows a schematic view of the light section sensor 100 in relation to two reference planes 113-1 and 113-2. The light section sensor 100 is aimed at first towards one of the reference planes 113-1 and 113-2. If the light section sensor 100 is precalibrated, it can detect that the reference planes 113-1 and 113-2 are flat surfaces. If the light section sensor 100 is precalibrated, a light section line 103 can be detected as an actual straight line. Automatic scanning of the measured object 105 from a defined direction 115-1 or 115-2 is made possible hereby.

The scanning from the directions 115-1 or 115-2 takes place to measure the measured object 105 in relation to the reference planes 113-1 and 113-2. Direction 115-1 is at right angles to the reference plane 113-1 and direction 115-2 is at right angles to the reference plane 113-2. The measured object 105 is, for example, a plastic profile, which is in contact with the two reference planes 113-1 and 113-2.

The distance of the measured object 105 in the first direction 115-1 in relation to the first reference plane 113-1 is determined by the light section sensor 100 in a first coordinate system. The distance of the measured object 105 in the second direction 115-1 in relation to the second reference line 113-1 can be determined by the light section sensor 100 after a coordinate transformation in a second coordinate system without the position of the light section sensor 100 having to be changed for this.

Figure 4:
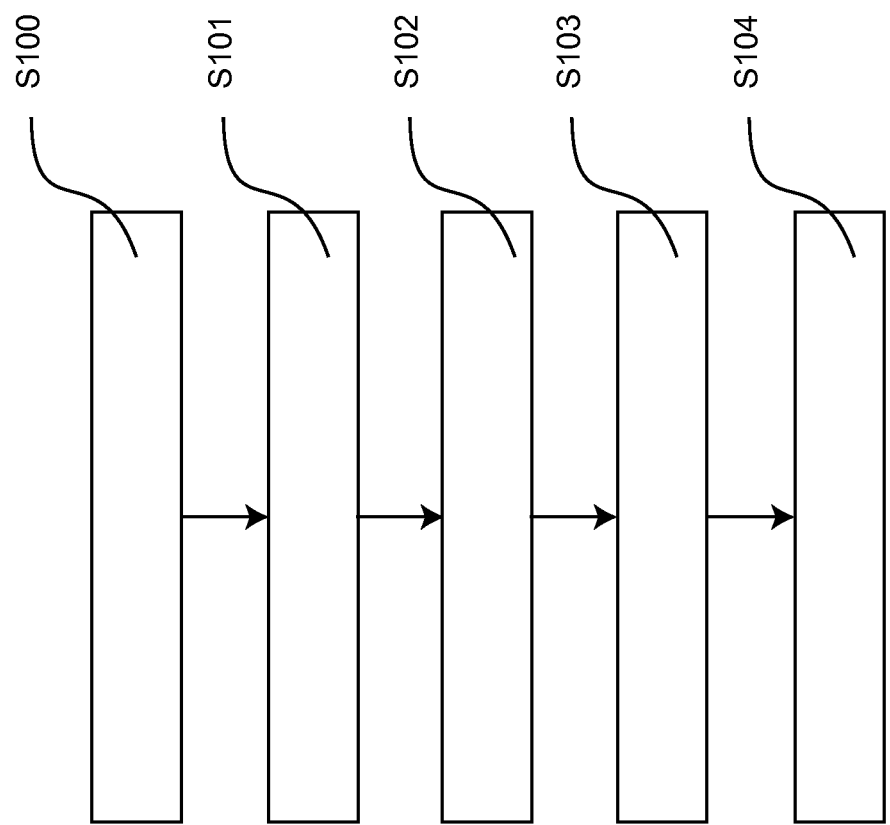
FIG. 4 is a block diagram of a method for a light section sensor.

FIG. 4 shows a block diagram of a method for a light section sensor 100 for providing an output of a digital output coordinate. The method comprises the steps of automatically determining S100 a slope angle of the light section sensor 100 in relation to a flat surface of the measured object 105, of projecting S101 a light line 103 onto the measured object 105 by means of an illumination means 101, of detecting S102 the projected light line 103 onto the measured object 105 by means of the electronic camera 107, of determining S103 at least one measured coordinate in the measured coordinate system X, Y, Z on the basis of the detected light line 103 by means of the processing means 109, and of transforming S104 the measured coordinate from the measured coordinate system X, Y, Z into the output coordinate in the output coordinate system X', Y', Z' by means of the coordinate transformation by a coordinate transformation means 111.

All the features explained and shown in connection with individual embodiments of the present invention may be provided in various combinations in the subject according to the present invention in order to achieve their advantageous effects simultaneously.

The scope of protection of the present invention is defined by the claims and is not limited by the features shown in the specification or the figures.

While specific embodiments of the invention have been shown and described in detail to illustrate the application of the principles of the invention, it will be understood that the invention may be embodied otherwise without departing from such principles.

What is claimed is:

1. A light section sensor for providing an output of a digital output coordinate, the light section sensor comprising:
    an illuminating means for projecting a light line onto a measured object;
    an electronic camera for detecting the projected light line on the measured object;
    a processing means for determining at least one measured coordinate in a measuring coordinate system on the basis of the light line detected;
    a coordinate transformation means for transforming the measured coordinate from the measuring coordinate system into an output coordinate in an output coordinate system by means of a coordinate transformation; and
    a slope angle determination means for determining the slope angle of the light section sensor in relation to a flat surface of the measured object.

2. A light section sensor in accordance with claim 1, wherein the slope angle determination means determines the slope angle on the basis of the light line detected.

3. A light section sensor in accordance with claim 2, wherein the slope angle determination means determines the slope angle on the basis of the longest straight segment of the light line detected.

4. A light section sensor in accordance with claim 1, wherein the coordinate transformation is based on a rotation matrix.

5. A light section sensor in accordance with claim 4, wherein the rotation matrix describes a rotation of the light section sensor by the slope angle in relation to the flat surface of the measured object.

6. A light section sensor in accordance with claim 2, the slope angle determination means comprises a data interface for inputting the slope angle.

7. A light section sensor in accordance with claim 1, wherein the coordinate transformation is based on a displacement vector.

8. A light section sensor in accordance with claim 1, wherein the light section sensor is configured to output the output coordinate and the measured coordinate via a data interface.

9. A light section sensor in accordance with claim 1, wherein the processing means determines the measured coordinate from a predetermined image area of the electronic camera.

10. A light section sensor in accordance with claim 1, wherein the coordinate transformation is a real-time coordinate transformation.

11. A method for providing an output of a digital output coordinate by means of a light section sensor, the comprising the steps of:
    projecting a light line onto a measured object by means of an illuminating means;
    detecting the projected light line on the measured object by means of an electronic camera;
    determining at least one measured coordinate in a measuring coordinate system on the basis of the detected light line by means of a processing means;
    transforming the measured coordinate from the measuring coordinate system into an output coordinate in an output coordinate system by means of a coordinate transformation by a coordinate transformation means, wherein the coordinate transformation is based on a slope angle of the light section sensor in relation to a flat surface of the measured object; and
    providing a slope angle determination means for determining the slope angle of the light section sensor in relation to the flat surface of the measured object.

12. A method in accordance with claim 11, wherein the coordinate transformation is based on a rotation matrix.

13. A method in accordance with claim 11, wherein the method comprises the step of determining a slope angle of the light section sensor in relation to a flat surface of the measured object with the slope angle determination means configured to determine the slope angle on the basis of the detected light line.

14. A method in accordance with claim 11, wherein the method comprises the step of determining a slope angle of the light section sensor in relation to the flat surface of the measured object with the slope angle determination means comprises a data interface for inputting the slope angle.

15. A light section sensor for providing an output of a digital output coordinate, the light section sensor comprising:
    a laser projecting a light line toward a reference plane support for measuring a measured object on the reference plane support;
    an electronic camera detecting the projected light line on at least one of the measured object and the reference plane support;
    a processing device comprising one or more processors determining at least one measured coordinate in a measuring coordinate system on the basis of the light line detected;
    a coordinate transformation device transforming the measured coordinate from the measuring coordinate system into an output coordinate in an output coordinate system based on a slope angle of the light section sensor in relation to at least one of a flat surface of the measured object and the reference plane support; and
    a slope angle determination device determining the slope angle of the light section sensor in relation to at least one of the flat surface of the measured object and the reference plane support.

16. A light section sensor in accordance with claim 15, wherein the slope angle determination device is comprised by the processing device, which determines the slope angle on the basis of the light line detected.

17. A light section sensor in accordance with claim 16, wherein the one or more processors determines the slope angle on the basis of the longest straight segment of the light line detected.

18. A light section sensor in accordance with claim 15, wherein the coordinate transformation is based on at least one of a rotation matrix and a displacement vector based on the slope angle.

19. A light section sensor in accordance with claim 18, wherein the rotation matrix describes a rotation of the light section sensor by the slope angle, which is at least one of in relation to a flat surface of the measured object and in relation to the reference plane support.

20. A light section sensor in accordance with claim 15, wherein the slope angle determination device is comprised by the processing device, which determines the slope angle based on an input of a data via a data interface for inputting the slope angle.

21. A method in accordance with claim 11, further comprising:
- determining a profile of the measured object in the measuring coordinate system on the basis of the detected light line; and
- transforming the profile from the measuring coordinate system into the output coordinate system based on the slope angle of the light sensor in relation to a flat portion of the profile.

* * * * *